United States Patent
Ahmad (10) Patent No.: US 10,025,602 B2
(45) Date of Patent: Jul. 17, 2018

(54) PRELINKED EMBEDDING

(71) Applicant: Mentor Graphics Corporation, Wilsonville, OR (US)

(72) Inventor: Irfan Ahmad, Lahore (PK)

(73) Assignee: Mentor Graphics Corporation, Wilsonville, OR (US)

( * ) Notice: Subject to any disclaimer, the term of this patent is extended or adjusted under 35 U.S.C. 154(b) by 62 days.

(21) Appl. No.: 14/730,009

(22) Filed: Jun. 3, 2015

(65) Prior Publication Data

US 2015/0347162 A1    Dec. 3, 2015

Related U.S. Application Data (60) Provisional application No. 62/006,992, filed on Jun. 3, 2014.

(51) Int. Cl.
*G06F 9/44* (2018.01)
*G06F 9/445* (2018.01)

(52) U.S. Cl.
CPC .............................. *G06F 9/44521* (2013.01)

(58) Field of Classification Search
None
See application file for complete search history.

(56) References Cited

U.S. PATENT DOCUMENTS

| | | | |
|---|---|---|---|
| 6,446,254 B1* | 9/2002 | Chapman | G06F 9/44573 717/116 |
| 6,983,460 B1* | 1/2006 | Goire | G06F 9/445 717/175 |
| 2010/0115503 A1* | 5/2010 | Lee | H04N 21/8173 717/168 |
| 2011/0107046 A1* | 5/2011 | Chen | G06F 17/30076 711/162 |
| 2011/0145472 A1* | 6/2011 | Whitehouse | G06F 8/65 711/103 |
| 2012/0117658 A1* | 5/2012 | Haga | G06F 21/64 726/26 |
| 2013/0290645 A1* | 10/2013 | Van De Ven | G06F 12/0284 711/147 |
| 2014/0365533 A1* | 12/2014 | Debray | G06F 17/30474 707/803 |

* cited by examiner

*Primary Examiner* — Wei Zhen
*Assistant Examiner* — Binh Luu
(74) *Attorney, Agent, or Firm* — Mentor Graphics Corporation (57) ABSTRACT

This application discloses a computing system configured to perform a pre-linked embedding process during build-time of a root-kernel application. The computing system can pre-link one or more dynamically-linkable executable modules against exported symbols of a root-kernel image, and embed the pre-linked executable modules into the root-kernel image. The computing system can load the root-kernel image having the embedded pre-linked executable modules into a memory of an embedded system, wherein at least one processing device in the embedded system is configured to execute the embedded pre-linked executable modules directly from the memory.

11 Claims, 6 Drawing Sheets

PRELINKED EMBEDDING

RELATED APPLICATION

This application claims priority to U.S. Provisional Patent Application Ser. No. 62/006,992, filed Jun. 3, 2014, which is incorporated by reference herein.

TECHNICAL FIELD

This application is generally related to electronic design automation and, more specifically, to pre-linked embedding of dynamically-linked executable software modules against a statically-linked root-kernel application image for execution-in-place in an embedded system.

BACKGROUND

Embedded systems often perform dedicated functions within larger mechanical or electrical systems, such as cars, telephones, modems, robots, appliances, toys, security systems, pacemakers, televisions, set-top boxes, digital watches, or the like. Most of these embedded systems include one or more processing devices executing embedded software—typically written in in C, C++, or the like—that can allow the embedded systems to perform the dedicated functions under real-time computing constraints, for example, by utilizing a real-time operating system, such as Nucleus real-time operating system (RTOS), or the like.

Programmers of embedded software often build their source code modularly, i.e., with a program that references or one or more different programs or libraries. These different programs or libraries are linked to the program so the program can be executed. This linking can be performed at compile time, when source code is translated into machine code, at load time, when the program is loaded into a memory device of the embedded system, or at run time, for example, dynamically by application programs.

There are a couple of different types of linking—static linking and dynamic linking—which can collect and combine multiple object files from the different programs and or libraries in order to create a single executable. Static linking, which is often performed by a compiler, copies library functions or routines referenced by the program into a monolithic executable software image. Dynamic linking can occur when an executable version of the program is loaded in a common memory with the programs or libraries to be linked and the executable version of the program is run by the embedded system. Since static linking links the program prior to runtime, a monolithic executable software image generated by static linking can usually be executed more quickly at runtime than a dynamically linked program and is usually more portable. The monolithic executable software image, however, often consumes more memory resources than its dynamically-linked counterpart, as the static linking scheme does not allow sharing of the different programs and libraries in the embedded system.

Many embedded systems, in an attempt to reduce writable memory consumption, have their processing devices execute this embedded software directly from long-term memory, often called execution-in-place (XIP), rather than copying it into a random access memory (RAM). Since dynamic linking of embedded software requires write operations during runtime operation, execution-in-place with dynamic-linking stores the executable images in writable memory, such as the random access memory. Once the dynamic-linking has been performed, however, the linked executable images, for the most part, remain static, which consumes the writable memory with a program having a large portion needing no additional writing during runtime.

SUMMARY

This application discloses a computing system implementing tools or mechanisms configured to perform a pre-linked embedding process, for example, during build-time of a root-kernel application. The computing system can pre-link one or more dynamically-linkable executable modules against exported symbols of a root-kernel image, and embed the pre-linked executable modules into the root-kernel image. The computing system can load the root-kernel image having the embedded pre-linked executable modules into a memory of an embedded system, wherein at least one processing device in the embedded system is configured to execute the embedded pre-linked executable modules directly from the memory. Embodiments of the pre-linked embedding process are described in greater detail below.

DETAILED DESCRIPTION

Illustrative Operating Environment

The execution of various applications may be implemented using computer-executable software instructions executed by one or more programmable computing devices. Because these embodiments of the invention may be implemented using software instructions, the components and operation of a generic programmable computer system on which various embodiments of the invention may be employed will first be described.

Figure 1:
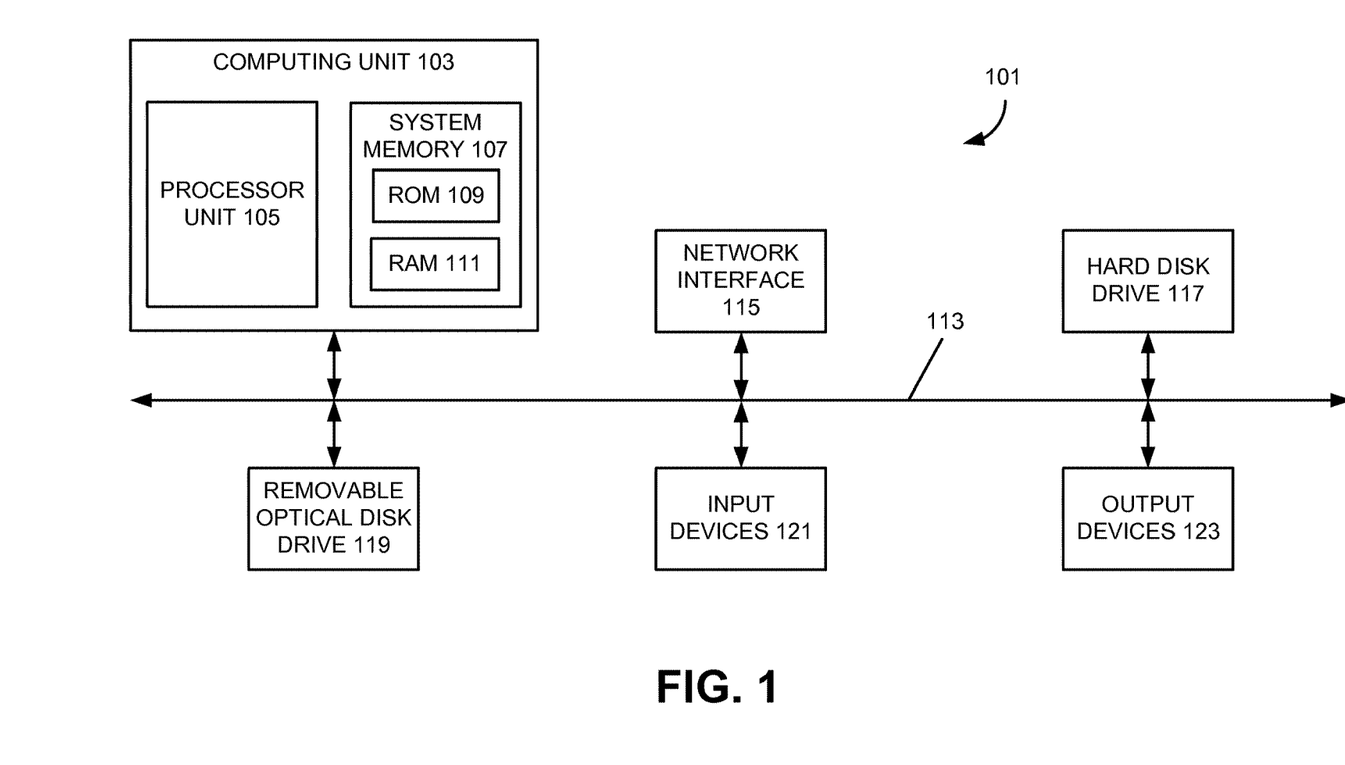
FIGS. 1 and 2 illustrate an example of a computer system of the type that may be used to implement various embodiments of the invention.

Various examples of the invention may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM)

109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the invention may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
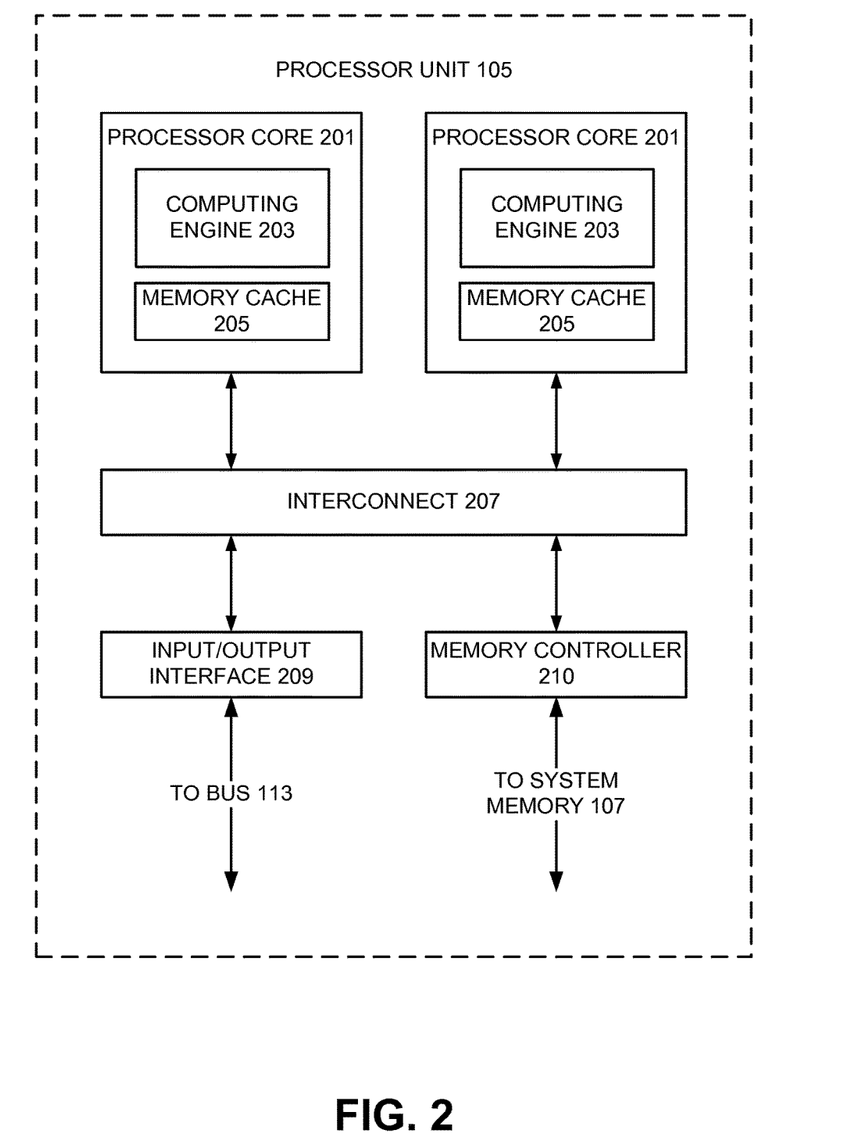

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif. the interconnect 207 may be implemented as a system request interface device. In any case, the processor cores 201 communicate through the interconnect 207 with an input/output interface 209 and a memory controller 211. The input/output interface 209 provides a communication interface between the processor unit 201 and the bus 113. Similarly, the memory controller 211 controls the exchange of information between the processor unit 201 and the system memory 107. With some implementations of the invention, the processor units 201 may include additional components, such as a high-level cache memory accessible shared by the processor cores 201.

It also should be appreciated that the description of the computer network illustrated in FIG. 1 and FIG. 2 is provided as an example only, and it not intended to suggest any limitation as to the scope of use or functionality of alternate embodiments of the invention.

Pre-Link Embedding

Figure 3:
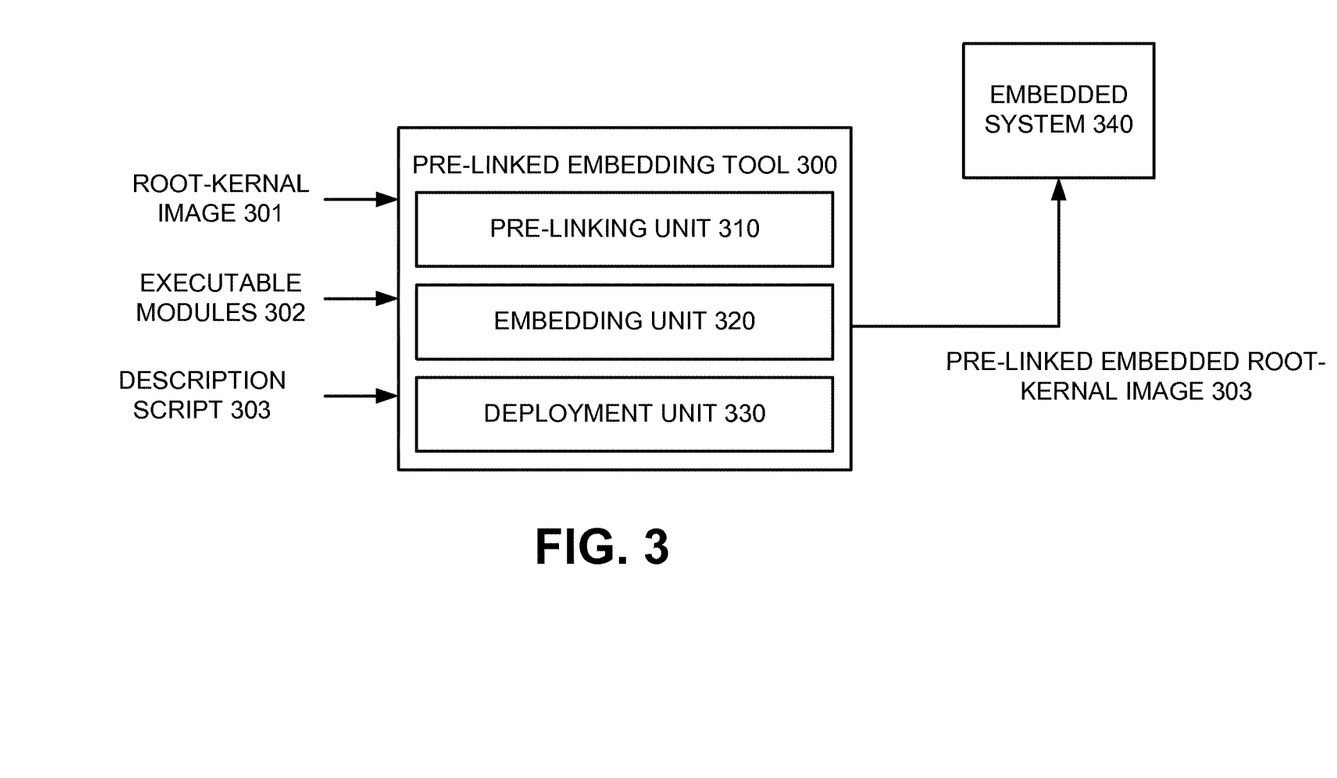
FIG. 3 illustrates an example system including a pre-link embedding tool and an embedded system according to various embodiments of the invention.

FIG. 3 illustrates an example system including a pre-link embedding tool 300 and an embedded system 340 according to various embodiments of the invention. Referring to FIG. 3, the pre-linked embedding tool 300 can receive a root-kernel image 301, multiple executable modules 302, and a description script 303. The root-kernel image 301 can be a statically-linked binary executable file or image having an Executable and Linkable Format (ELF), for example, specified with an output (.out) file extension, or the like. The root-kernel image 301 can implement an Application Binary Interface (ABI), which can provide an interface for a separately compiled executable files or images.

The executable modules 302 can be binary executable files or image, which can be dynamically-linkable together, for example, with one of the executable modules 302 references a variable or calls a function of another one of the executable modules 302. In some embodiments, the executable modules 302 can be separately compiled applications, library modules, a combination thereof, or the like.

The description script 303 can define a list of the executable modules 302 received by the pre-linked embedding tool 300 to pre-link and embed into the root-kernel image 301, which forms a pre-linked embedded root-kernel image 304. In some embodiments, the description script 303 can be a text file, for example, having an extended position description (.epd) file extension, or the like. The description script 303 can include directives to the pre-linked embedding tool 300, such as load commands to identify which of the executable modules to load and set commands to identify optional parameters, such as stack memory size, heap memory size, a kernel mode, or the like.

The pre-linked embedding tool 300 can include a pre-linking unit 310 to parse the description script 303 to identify the list of the executable modules 302 to load for the pre-linking. The pre-linking unit 310 can determine a first available read-only memory (ROM) address, and a first available writable memory address, such as RAM, as well as exported symbols from the root-kernel image 301. In some embodiments, the pre-linking unit 310 can read the first available read-only memory address and the first available writable memory address from a "meminfo" field in the root-kernel image 301.

The pre-linking unit 310 can pre-link the executable modules 302 identified in the list parsed from the description script 303. The pre-linking by the pre-linking unit 310 can include traversing the executable modules 302 to identify symbols and resolving them against the exported symbols form the root-kernel image 301. The pre-linking by the pre-linking unit 310, in some embodiments, also can include assigning target addresses in a memory of the embedded system 340 based on the first available read-only memory address and the first available writable memory address. As will be discussed below, portions of the executable modules 302, once appropriately linked, can reside in read-only memory during runtime, thus allowing the pre-linking unit 310 to assign those portions target addresses in a read-only memory of the embedded system 340. Other portions of the executable modules 302 may be written to during runtime in the embedded system 340, and thus the pre-linking unit 310 can assign those portions target addresses in a writable memory of the embedded system 340, such as RAM or the like. Embodiments of the pre-linking will be described below in greater detail.

The pre-linked embedding tool 300 can include an embedding unit 320 to embed the pre-linked executable modules into the root-kernel image 301, which can generate monolithic deployable object, such as the pre-linked embedded root-kernel image 304. In some embodiments, the root-kernel image 301 and the pre-linked executable modules can be stored separately in the memory of the embedded system 340, allowing them to be loaded during early system startup, for example, via a boot-loader implemented in the embedded system 340. The pre-linked executable modules can include information corresponding to the links to the exported symbols of the root-kernel image 301 and information of their assigned target address in the memory of the embedded system 340. In some embodiments, the embedding unit 320 can generate a placeholder in the root-kernel image 301 for embedding of the pre-linked executable modules. The embedding unit 320 can embed the pre-linked executable modules into the root-kernel image 301 by replacing the placeholder in the root-kernel image 301 with binary code corresponding to the pre-linked executable modules. Embodiments of the embedding of the pre-linked executable modules will be described below in greater detail.

The pre-linked embedding tool 300 can include a deployment unit 330 to load the pre-linked embedded root-kernel image 304 into the embedded system 340. In some embodiments, the deployment unit 330 can load the root-kernel image 301 and the pre-linked executable modules separately in memory of the embedded system 340. The embedded system 340 can execute the pre-linked embedded root-kernel image 304 directly from the memory, i.e., execute-in-place (XIP). In some embodiments, the pre-linked embedded root-kernel image 304 can include a mix of embedded pre-linked executable modules, for example, some being executed by the embedded system 340 directly from ROM and some being executed by the embedded system 340 directly from RAM.

During execution of the pre-linked embedded root-kernel image 304, the embedded system 340 can load the pre-linked executable modules embedded in the pre-linked embedded root-kernel image 304 and from that point onwards, the pre-linked executable modules can behave similar to the modules linked and loaded dynamically during runtime by the embedded system 340. Since the pre-linked embedding of the executable modules 302 can be performed offline, for example, as a build-time step, runtime dynamic linking and relocation can be avoided, resulting in a system with fast startup, typical of monolithic statically-linked modules, but the modularity typical of general-purpose high-end operating systems.

Figure 4A:
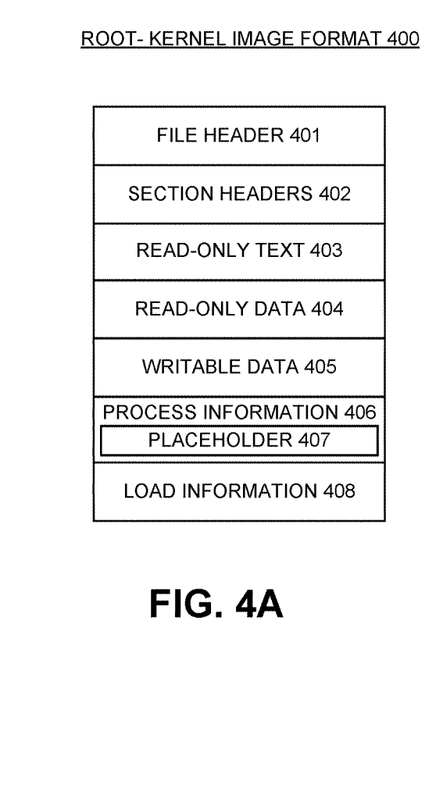
FIGS. 4A and 4B illustrate an example root-kernel image format along with an example section layout after pre-linked embedding according to various embodiments of the invention.
Figure 4B:
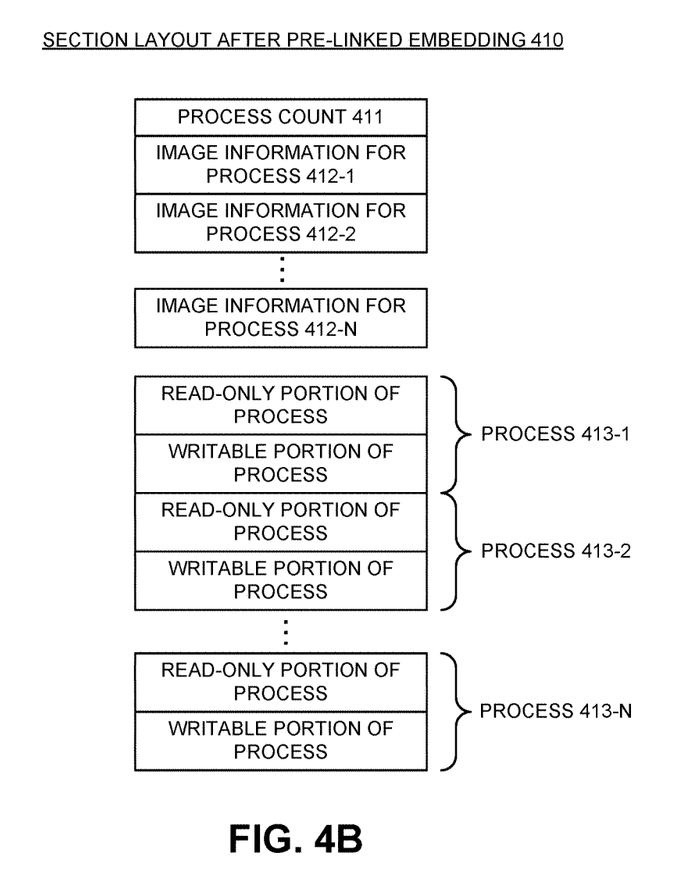

FIGS. 4A and 4B illustrate an example root-kernel image format 400 along with an example section layout after pre-linked embedding 410 according to various embodiments of the invention. Referring to FIG. 4A, the root-kernel image format 400, for example, corresponding to an Executable and Linkable Format (ELF), can include multiple portions, such as a file header 401, section headers 402, read-only text 403, read-only data 404, writable data 405, process information 406, load information 408, and the like. These portions of the root-kernel image format 400 can be similar to various fields in an Executable and Linkable Format (ELF) except the root-kernel image format 400 can include a placeholder 407, shown in this embodiment as being located in the process information 406 portion of the root-kernel image format 400. A pre-linked embedding tool can generate the placeholder 407 for embedding of pre-linked executable modules and insert it into the root-kernel image format 400. Although FIG. 4A shows the placeholder 407 being located in the process information 407 portion of the root-kernel image format 400, in some embodiments, the placeholder 407 can be located in other portions of the root-kernel image format 400 or divided among multiple different portions of the root-kernel image format 400.

Referring to FIG. 4B, the section layout after pre-linked embedding 410 of the root-kernel image having the root-kernel image format 400 is shown. In some embodiments, the section layout after pre-linked embedding 410 can correspond to binary code corresponding to the pre-linked executable modules and their corresponding information replacing the placeholder 407 in root-kernel image format 400 after pre-linked embedding 410 of the root-kernel image.

The section layout after pre-linked embedding 410 can include a process count 411, image information 412-1 to 412-N for processes 13-1 to 413-N or pre-linked executable modules embedded in the root-kernel image, and the processes 13-1 to 413-N or pre-linked executable modules embedded in the root-kernel image. The process count 411 can identify a number of the processes 413-1 to 413-N or pre-linked executable modules have been embedded in the root-kernel image.

The image information 412 can include a separate image information field 412-1 to 412-N for each of the processes or pre-linked executable modules have been embedded in the root-kernel image. In some embodiments, the image information 412-1 to 412-N can include information corresponding to the target addresses assigned to the pre-linked embedded modules, the symbol resolution of the pre-linked executable modules, or the like, that was determined during the pre-linked embedding process. In some embodiments, the processes 413-1 to 413-N can include separate data portions, for example, divided into read-only portions, such as a read-only text section and a read-only data section, and into writable portions, such as a write data section, a stack data section, and heap data section. Although FIG. 4B shows the processes 413-1 to 413-N as being separated in the section layout after pre-linked embedding 410, in some embodiments, the processes 413-1 to 413-N can be rearranged, for example, grouping common data portions together, or the like.

Figure 5:
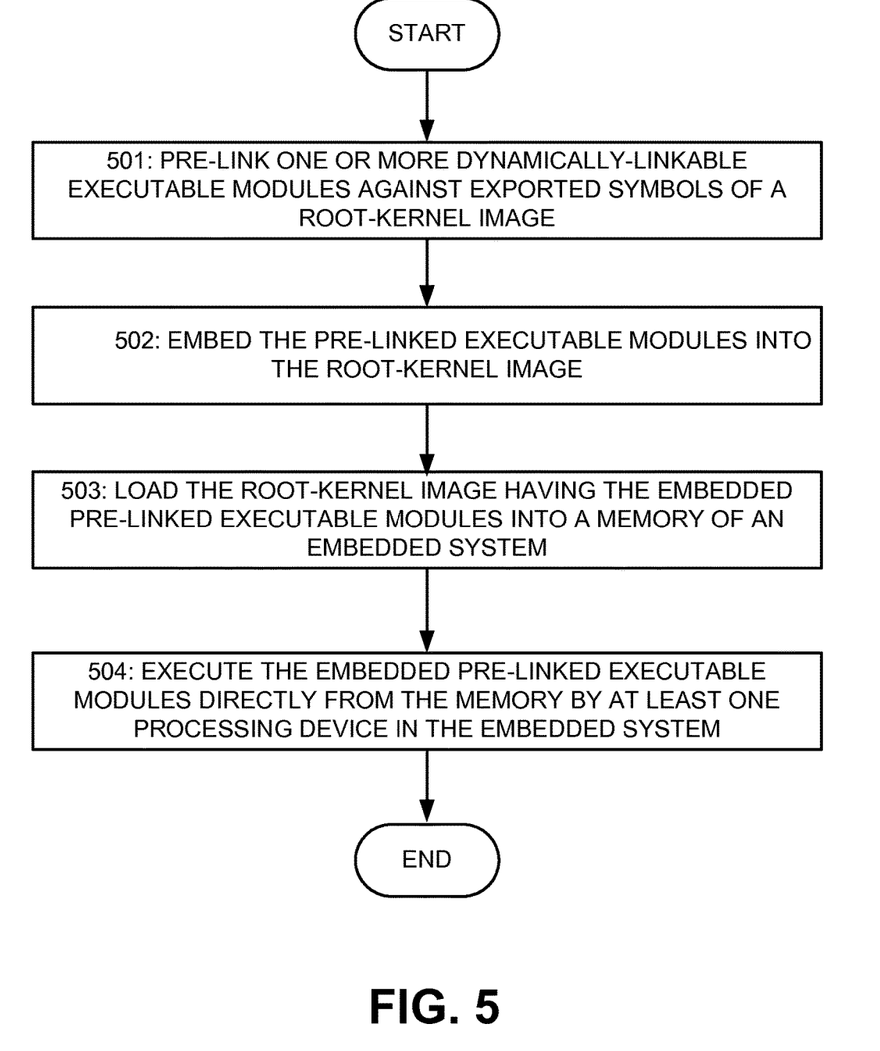
FIG. 5 illustrates a flowchart showing an example execution-in-place with dynamically-linkable executable modules utilizing pre-linked embedding according to various examples of the invention.

FIG. 5 illustrates a flowchart showing an example execution-in-place with dynamically-linkable executable modules utilizing pre-linked embedding according to various examples of the invention. Referring to FIG. 5, in a block 501, a computing system can pre-link one or more dynamically-linkable executable modules against exported symbols of a root-kernel image. In some embodiments, the computing system can identify which dynamically-linkable executable modules to pre-link by parsing a description script to identify the list of the executable modules to load for the pre-linking.

In the pre-linking process, the computing system can traverse the dynamically-linkable executable modules to identify unresolved symbols and then resolve them against the exported symbols form the root-kernel image. The computing system, in some embodiments, also can assign target addresses in a memory of an embedded system based on a first available read-only memory address and a first available writable memory address available from the root-kernel image. The computing system can assign certain portions of the executable modules to target addresses in a read-only memory of the embedded system, while assigning other portions of the executable modules to target address in a writable memory of the embedded system.

In a block 502, the computing system can embed the pre-linked executable modules into the root-kernel image, which can generate a monolithic deployable object. In some embodiments, the computing system can generate a placeholder in the root-kernel image for embedding of the pre-linked executable modules. The computing system can embed the pre-linked executable modules into the root-kernel image by replacing the placeholder in the root-kernel image with binary code corresponding to the pre-linked executable modules. Embodiments of the embedding of the pre-linked executable modules will be described below in greater detail.

In a block 503, the computing system can load the root-kernel image having the embedded pre-linked executable modules into the memory of the embedded system, and in a block 504, the computing system can execute the embedded pre-linked executable modules directly from the memory by at least one processing device in the embedded system. This execution directly from memory by the embedded system, called execute-in-place (XIP), can allow for execution those portions of the dynamically-linkable executable modules residing in a read-only memory, or execution-from-ROM. In some embodiments, the root-kernel image can be embedded with a mix of embedded pre-linked executable modules, for example, some being executed by the embedded system directly from ROM and some being executed by the embedded system directly from RAM.

During execution of the root-kernel image having the embedded pre-linked executable modules, the embedded system can load the pre-linked executable modules embedded in the root-kernel image and from that point onwards, the pre-linked executable modules can behave similar to the modules linked and loaded dynamically during runtime by the embedded system. Since the pre-linked embedding of the executable modules can be performed offline, for example, as a build-time step, runtime dynamic linking and relocation can be avoided, resulting in a system with fast startup, typical of monolithic statically-linked modules, but the modularity typical of general-purpose high-end operating systems.

Figure 6:
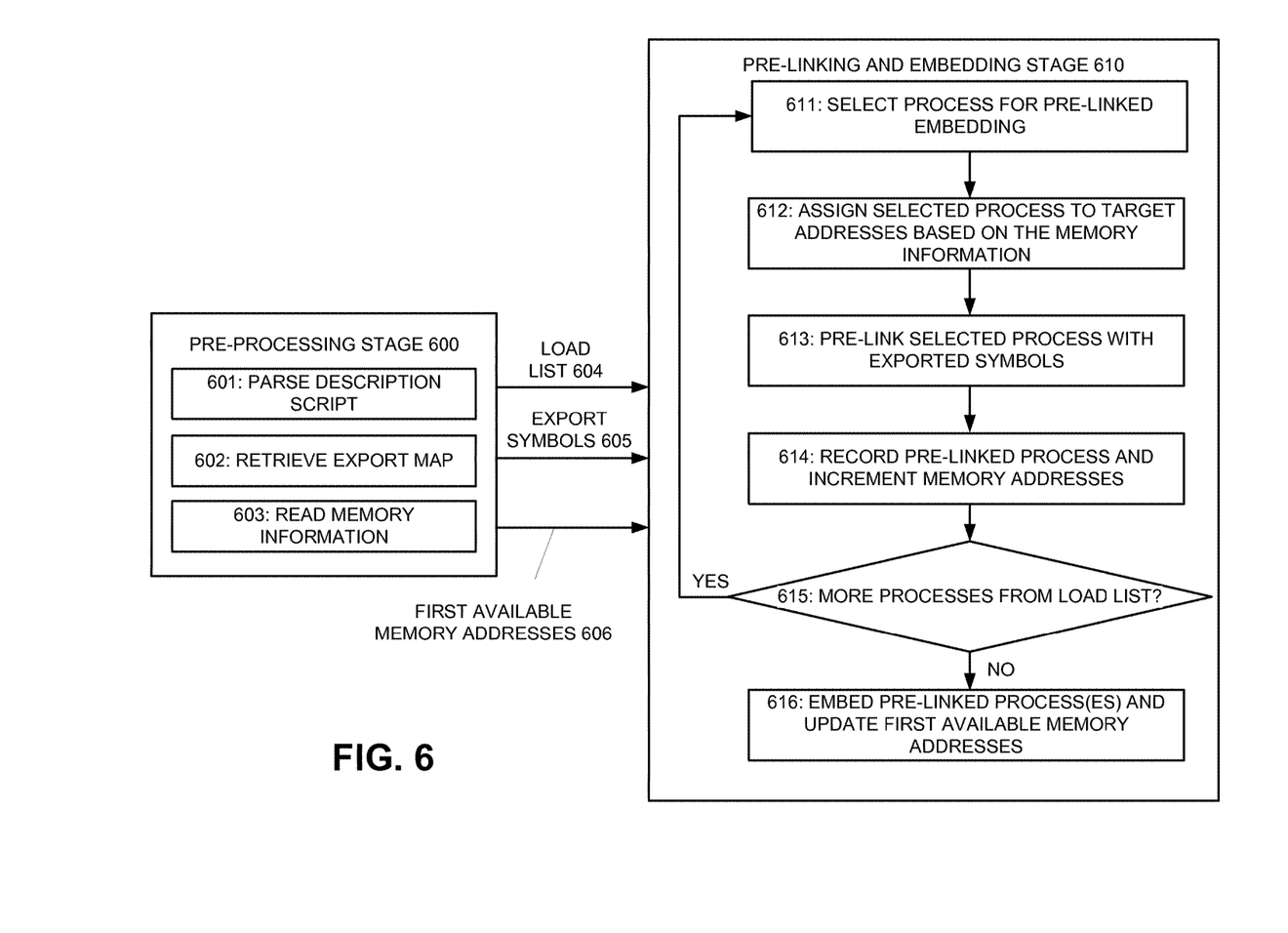
FIG. 6 illustrates a flowchart showing an example pre-linked embedding of a root-kernel image with dynamically-linkable executable modules with according to various examples of the invention.

FIG. 6 illustrates a flowchart showing an example pre-linked embedding of a root-kernel image with dynamically-linkable executable modules with according to various examples of the invention. Referring to FIG. 6, a computing system implementing a pre-linked embedding tool can perform pre-linked embedding of the root-kernel image with two stages: a pre-processing stage 600 and a pre-linking and embedding stage 610.

The pre-processing stage 600 can identify information, such as a load list 604, export symbols 605 of the root-kernel image, and first available memory addresses 606 corresponding to the different types of memory in an embedded system. The pre-processing stage 600 can pass the identified information to the pre-linking and embedding stage 610 for use in pre-linked embedding of a root-kernel image with dynamically-linkable executable modules.

In a block 601 of the pre-processing stage 600, the computing system implementing the pre-linked embedding tool can parse a description script to identify the load list 604. The description script can define a list of the dynamically-linkable executable modules to pre-link and embed into the root-kernel image. In some embodiments, the description script can be a text file, for example, having an extended position description (.epd) file extension, or the like. The description script can include directives, such as load commands to identify which of the dynamically-linkable executable modules to load and set commands to identify optional parameters, such as stack memory size, heap memory size, a kernel mode, or the like. In a block 602 of the pre-processing stage 600, the computing system implementing the pre-linked embedding tool can retrieve export map, which includes the export symbols 605 of the root-kernel image. In a block 603 of the pre-processing stage 600, the computing system implementing the pre-linked embedding tool can read memory information of the root-kernel image, which includes the first available memory addresses 606 corresponding to the different types of memory in an embedded system.

In a block 611 of the pre-linking and embedding stage 610, the computing system implementing the pre-linked embedding tool can select a process for pre-linked embedding. In some embodiments, the computing system implementing the pre-linked embedding tool can select the process for pre-linked embedding from the processes included in the load list 604.

In a block 612 of the pre-linking and embedding stage 610, the computing system implementing the pre-linked embedding tool can assign the selected process to target addresses based on the first available memory addresses read from the root-kernel image. In some embodiments, the computing system implementing the pre-linked embedding tool can assign the read-only portions of the selected process to target addresses in a read-only memory of the embedded system, while assigning writable portions of the selected process to target addresses in a writable memory of the embedded system.

In a block 613 of the pre-linking and embedding stage 610, the computing system implementing the pre-linked embedding tool can pre-link selected process with export symbols 605. For example, the computing system implementing the pre-linked embedding tool can traverse the selected process to identify unresolved symbols and resolving them against the export symbols 605 from the root-kernel image.

In a block 614 of the pre-linking and embedding stage 610, the computing system implementing the pre-linked embedding tool can record pre-linked process and increment memory addresses.

In a decision block 615 of the pre-linking and embedding stage 610, the computing system implementing the pre-linked embedding tool can determine whether the load list 604 include more processes to pre-link. If the computing system implementing a pre-linked embedding tool determines there are more processes to pre-link, execution in the pre-linking and embedding stage 610 returns to the block 611 for selection of another process to be pre-linked and embedded.

If the computing system implementing the pre-linked embedding tool determines there are no more processes to pre-link, execution continues to a block 616 of the pre-linking and embedding stage 610, where the computing system implementing a pre-linked embedding tool can embed pre-linked processes in the root-kernel image and update first available memory addresses in the root-kernel image. In some embodiments, the computing system implementing the pre-linked embedding tool can generate a placeholder in the root-kernel image for embedding of the pre-linked executable modules. The computing system implementing the pre-linked embedding tool can embed the pre-linked processes into the root-kernel image by replacing the placeholder in the root-kernel image with binary code corresponding to the pre-linked executable modules. The root-kernel image, as embedded with the pre-linked processes, can be deployed as a monolithic executable that can execute at least a portion of the pre-linked processes directly from read-only memory.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to certain processes, it should be appreciated that various examples of the invention may be implemented using any desired combination of processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
   parsing, by a computing system, a first available read-only memory address and a first available writable memory address from a root-kernel image;
   identifying, by the computing system, exported symbols of the root-kernel image;

pre-linking, by the computing system, one or more dynamically-linkable executable modules against the exported symbols of the root-kernel image to generate pre-linked executable modules;

inserting, by the computing system, the pre-linked executable modules into the root-kernel image, which embeds the pre-linked executable modules in the root-kernel image to generate a pre-linked embedded root-kernel image; and loading, by the computing system, a first portion of the pre-linked embedded root-kernel image into a read-only portion of a memory in an embedded system based on the read-only memory address, and loading a second portion of the pre-linked embedded root-kernel image into a writable portion of the memory in the embedded system based on the writable memory address, wherein at least one processing device in the embedded system is configured to execute the embedded pre-linked executable modules directly from the memory.

2. The method of claim 1, further comprising receiving, by the computing system, a process description script configured to identify the one or more dynamically-linked executable modules to embed in the root-kernel image, wherein the pre-linking of the one or more processes is performed based, at least in part, on the process description script.

3. The method of claim 1, wherein the dynamically-linked executable modules include at least one of an application or a library module included in an object file.

4. The method of claim 1, further comprising generating, by the computing system, a placeholder in the root-kernel image, wherein inserting the pre-linked executable modules into the root-kernel image further comprises replacing the placeholder in the root-kernel image with binary code including the pre-linked executable modules.

5. A system comprising:

a non-transitory memory system configured to store computer-executable instructions; and a computing system, in response to execution of the computer-executable instructions, is configured to:

parse a first available read-only memory address and a first available writable memory address from a root-kernel image;

identify exported symbols of the root-kernel image;

pre-link one or more dynamically-linkable executable modules against the exported symbols of the root-kernel image to generate pre-linked executable modules;

insert the pre-linked executable modules into the root-kernel image, which embeds the pre-linked executable modules in the root-kernel image to generate a pre-linked embedded root-kernel image; and load a first portion of the pre-linked embedded root-kernel image into a read-only portion of a memory in an embedded system based on the read-only memory address, and loading a second portion of the pre-linked embedded root-kernel image into a writable portion of the memory in the embedded system based on the writable memory address, wherein at least one processing device in the embedded system is configured to execute the embedded pre-linked executable modules directly from the memory.

6. The system of claim 5, wherein the computing system, in response to execution of the computer-executable instructions, is further configured to identify the one or more dynamically-linkable executable modules to embed in the root-kernel image based, at least in part, on a process description script.

7. The system of claim 5, wherein the computing system, in response to execution of the computer-executable instructions, is further configured to generate a placeholder in the root-kernel image, and insert the pre-linked executable modules into the root-kernel image by replacing the placeholder in the root-kernel image with binary code including the pre-linked executable modules.

8. An apparatus comprising at least one non-transitory computer-readable memory device storing instructions configured to cause one or more processing devices to perform operations comprising:

parsing a first available read-only memory address and a first available writable memory address from a root-kernel image;

identifying exported symbols of the root-kernel image;

pre-linking one or more dynamically-linkable executable modules against the exported symbols of the root-kernel image to generate pre-linked executable modules;

inserting the pre-linked executable modules into the root-kernel image, which embeds the pre-linked executable modules in the root-kernel image to generate a pre-linked embedded root-kernel image; and loading a first portion of the pre-linked embedded root-kernel image into a read-only portion of a memory in an embedded system based on the read-only memory address, and loading a second portion of the pre-linked embedded root-kernel image into a writable portion of the memory in the embedded system based on the writable memory address, wherein at least one processing device in the embedded system is configured to execute the embedded pre-linked executable modules directly from the memory.

9. The apparatus of claim 8, wherein the instructions are configured to cause the one or more processing devices to perform operations further comprising identifying the one or more dynamically-linked executable modules to embed in the root-kernel image based, at least in part, on the process description script.

10. The apparatus of claim 8, wherein the dynamically-linked executable modules include at least one of an application or a library module included in an object file.

11. The apparatus of claim 8, wherein the instructions are configured to cause the one or more processing devices to perform operations further comprising generating a placeholder in the root-kernel image, wherein inserting the pre-linked executable modules into the root-kernel image further comprises replacing the placeholder in the root-kernel image with binary code including the pre-linked executable modules.

* * * * *